US012257837B2

(12) United States Patent
Martin et al.

(10) Patent No.: US 12,257,837 B2
(45) Date of Patent: Mar. 25, 2025

(54) INTERSPERSED FLUIDIC ELEMENTS AND CIRCUIT ELEMENTS IN A FLUIDIC DIE

(71) Applicant: Hewlett-Packard Development Company, L.P., Spring, TX (US)

(72) Inventors: Eric T. Martin, Corvallis, OR (US); James R. Przybyla, Corvallis, OR (US); Garrett E. Clark, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 205 days.

(21) Appl. No.: 18/032,797

(22) PCT Filed: Oct. 23, 2020

(86) PCT No.: PCT/US2020/057109
§ 371 (c)(1),
(2) Date: Apr. 19, 2023

(87) PCT Pub. No.: WO2022/086560
PCT Pub. Date: Apr. 28, 2022

(65) Prior Publication Data
US 2023/0382109 A1 Nov. 30, 2023

(51) Int. Cl.
*B41J 2/14* (2006.01)
*B41J 2/145* (2006.01)

(52) U.S. Cl.
CPC ............. *B41J 2/1404* (2013.01); *B41J 2/145* (2013.01); *B41J 2202/12* (2013.01); *B41J 2202/13* (2013.01)

(58) Field of Classification Search
CPC ...... B41J 2/1404; B41J 2/145; B41J 2202/12; B41J 2202/13
See application file for complete search history.

(56) References Cited

U.S. PATENT DOCUMENTS 5,648,805 A 7/1997 Keefe et al.
5,790,149 A 8/1998 Abe et al.
(Continued)

FOREIGN PATENT DOCUMENTS

CN 107206791 A 9/2017
GB 2563719 A 12/2018
(Continued)

OTHER PUBLICATIONS

Gardner et al., "Die for a Printhead" (WO 2020162915 A1), Aug. 13, 2020, [Paragraphs 0036-0043]. (Year: 2020).*
(Continued)

*Primary Examiner* — Lisa Solomon
(74) *Attorney, Agent, or Firm* — Foley & Lardner LLP

(57) ABSTRACT

In some examples, a fluidic die includes an arrangement of fluidic elements to dispense a fluid, where each fluidic element of the fluidic elements includes a fluidic actuator and a fluid chamber. The fluidic die includes an array of fluid feed holes in a plurality of dimensions to communicate the fluid with the fluidic elements, where each of multiple fluid feed holes along a first dimension of the plurality of dimensions is distinct from multiple fluid feed holes along a second dimension of the plurality of dimensions. The fluidic die includes circuit elements interspersed in regions between the fluidic elements along different axes of the fluidic die, where each circuit element of the circuit elements includes an active device. The fluidic elements and the circuit elements are formed on a common substrate.

15 Claims, 5 Drawing Sheets

(56) References Cited

U.S. PATENT DOCUMENTS

| | | | |
|---|---|---|---|
| 7,488,056 | B2 | 2/2009 | Torgerson et al. |
| 7,758,171 | B2 | 7/2010 | Brost |
| 8,474,951 | B2 | 7/2013 | Inoue et al. |
| 9,278,368 | B2 | 3/2016 | Bibl et al. |
| 9,610,772 | B2 | 4/2017 | Maxfield et al. |
| 9,623,659 | B2 | 4/2017 | Govyadinov et al. |
| 2001/0040596 | A1 | 11/2001 | Lee et al. |
| 2013/0063522 | A1 | 3/2013 | Arai et al. |
| 2013/0106961 | A1 | 5/2013 | Van Brocklin et al. |
| 2015/0124024 | A1 | 5/2015 | Rivas et al. |
| 2016/0176188 | A1 | 6/2016 | Mabuchi et al. |
| 2017/0320320 | A1 | 11/2017 | Martin et al. |
| 2018/0015732 | A1 | 1/2018 | Chen et al. |
| 2019/0047287 | A1 | 2/2019 | Okushima et al. |

FOREIGN PATENT DOCUMENTS

| | | | | |
|---|---|---|---|---|
| WO | 2016/137490 | A1 | 9/2016 | |
| WO | 2019/177576 | A1 | 9/2019 | |
| WO | WO-2020162915 | A1 * | 8/2020 | .......... B41J 2/04581 |

OTHER PUBLICATIONS

HPDC, International Appl. No. PCT/US2020/057112 entitled Arrangements of Circuit Elements and Fluidic Elements filed Oct. 23, 2020, pp. 33.

* cited by examiner

INTERSPERSED FLUIDIC ELEMENTS AND CIRCUIT ELEMENTS IN A FLUIDIC DIE

CROSS-REFERENCE TO RELATED APPLICATIONS

This application is filed under 35 U.S.C. § 371 as a U.S. National Stage of PCT International Application No. PCT/US2020/057109, filed Oct. 23, 2020, which is incorporated by reference herein in its entirety.

BACKGROUND

A fluid dispensing system can dispense fluid towards a target. In some examples, a fluid dispensing system can include a printing system, such as a two-dimensional (2D) printing system or a three-dimensional (3D) printing system. A printing system can include printhead devices that include fluidic actuators to cause dispensing of printing fluids.

BRIEF DESCRIPTION OF THE DRAWINGS

Some implementations of the present disclosure are described with respect to the following figures.

Figure 1:
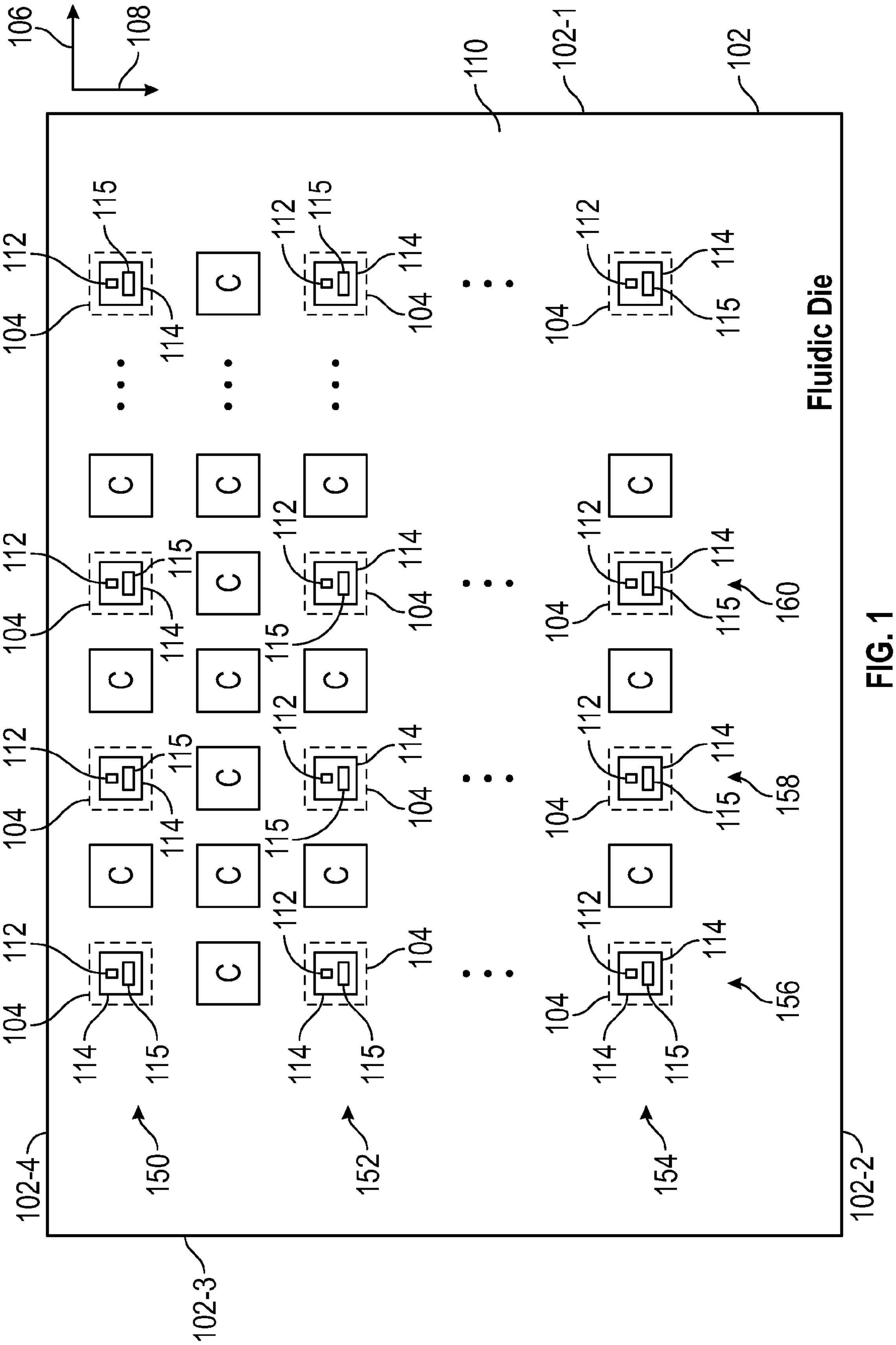
FIG. 1 is a block diagram of a fluidic die including an interspersed arrangement of fluidic cells and circuit elements, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A fluid dispensing device can include fluidic actuators that when activated cause dispensing (e.g., ejection or other flow) of a fluid. For example, the dispensing of the fluid can include ejection of fluid droplets by activated fluidic actuators from respective nozzles of the fluid dispensing device. In other examples, an activated fluidic actuator (such as a pump) can cause fluid to flow through a fluid conduit or fluid chamber. Activating a fluidic actuator to dispense fluid can thus refer to activating the fluidic actuator to eject fluid from a nozzle or activating the fluidic actuator to cause a flow of fluid through a flow structure, such as a flow conduit, a fluid chamber, and so forth.

In some examples, the fluidic actuators include thermal-based fluidic actuators including heating elements, such as resistive heaters. When a heating element is activated, the heating element produces heat that can cause vaporization of a fluid to cause nucleation of a vapor bubble (e.g., a steam bubble) proximate the thermal-based fluidic actuator that in turn causes dispensing of a quantity of fluid, such as ejection from an orifice of a nozzle or flow through a fluid conduit or fluid chamber. In other examples, a fluidic actuator may be a deflecting-type fluidic actuator such as a piezoelectric membrane based fluidic actuator that when activated applies a mechanical force to dispense a quantity of fluid.

In examples where a fluid dispensing device includes nozzles, each nozzle can include an orifice through which fluid is dispensed from a fluid chamber, in response to activation of a fluidic actuator. Each fluid chamber provides the fluid to be dispensed by the respective nozzle. In other examples, a fluid dispensing device can include a microfluidic pump that has a fluid chamber.

Generally, a fluidic actuator can be an ejecting-type fluidic actuator to cause ejection of a fluid, such as through an orifice of a nozzle, or a non-ejecting-type fluidic actuator to cause displacement of a fluid.

In some examples, a fluid dispensing device can be in the form of a fluidic die. A "die" refers to an assembly where various layers are formed onto a substrate to fabricate circuitry, fluid chambers, and fluid conduits. Multiple fluidic dies can be mounted or attached to a support structure.

In some examples, a fluidic die can be a printhead die, which can be mounted to a print cartridge, a carriage assembly, and so forth. A printhead die includes nozzles through which a printing fluid (e.g., an ink, a liquid agent used in a 3D printing system, etc.) can be dispensed towards a target (e.g., a print medium such as a paper sheet, a transparency foil, a fabric, etc., or a print bed including 3D parts being formed by a 3D printing system to build a 3D object).

A fluidic die includes fluidic elements and circuitry that control fluid dispensing operations of the fluidic elements. The circuitry includes logic that is responsive to address signals and control signals to produce output signals that control switching elements used for activating respective fluidic actuators in the fluid elements.

A fluidic element includes flow structures that provide for fluid flow in the fluidic element. Examples of flow structures include any or some combination of the following: a fluid chamber that stores a fluid to be dispensed by the fluid element, an orifice through which fluid can pass from the fluid chamber to a region outside the fluid chamber, a fluid feed hole that is used to communicate fluid between a fluid flow conduit and the fluid chamber in the fluid element, a fluid channel to transport fluid, and a fluidic actuator that when activated causes dispensing of a fluid by the fluid element (a fluidic actuator can include a thermal-based fluidic actuator or a deflecting-type fluidic actuator, for example).

In some examples, a fluidic die includes fluidic elements contained in fluidic architecture regions that do not include circuitry with active devices. In such examples, the fluidic die is partitioned into the fluidic architecture regions and circuit regions that are outside of the fluidic architecture regions. The circuit regions include circuit elements that include active devices.

As used here, an "active device" can refer to a device that can be switched between different states, such as an on state at which electrical current flows through the device, and off state at which electrical current does not flow through the device (or the amount of electrical current flow is negligible or below a specified threshold). An example of an active device is a transistor, such as a field effect transistor (FET). A transistor has a gate that is connected to a signal ("gate signal") to control the state of the transistor. When the gate signal is at an active level (e.g., a low voltage or a high voltage depending on the type of transistor used), the transistor turns on to conduct electrical current between two other nodes of the transistor (e.g., a drain node and a source node of an FET). On the other hand, if the gate signal is at an inactive level (e.g., a high voltage or a low voltage depending on the type of transistor used), then no electrical current flows through the transistor (or the amount of electrical current through the transistor is negligible or below a specified threshold). In some cases, the gate signal to the transistor can be set at an intermediate level between the active level or the inactive level, which causes the transistor to conduct an intermediate amount of electrical current.

Another example of an active device is a diode. If the voltage across two nodes of the diode exceeds a threshold voltage, then the diode turns on to conduct electrical current through the diode. However, if the voltage across that the two nodes of the diode is less than the threshold voltage, and the diode remains off.

Partitioning a fluidic die between fluidic architecture regions and circuit regions may simplify the interface between the circuit elements and the fluidic elements, or may be performed because of the arrangement of fluid feed slots in the fluidic die. A fluid feed slot refers to a fluid conduit that may run along an entire actuator column of the fluidic die. The fluid feed slot is used to carry fluid to and from the fluidic elements of the fluidic die.

Certain types of fluidic dies may employ a sparse arrangement of fluidic elements (the fluidic elements are arranged in patterns of lower density than fluidic elements in other fluidic dies). If a fluidic die has a sparse arrangement of fluidic elements, then the fluidic architecture regions would consume a larger area of the fluidic die than fluidic architecture regions of a fluidic die with a denser arrangement of fluidic elements. Given the same size of a fluidic die and assuming a same quantity of fluidic elements is used (compared to another fluidic die with a denser arrangement of fluidic elements), the larger fluidic architecture regions of the sparse arrangement would result in smaller circuit regions in the fluidic die, which leads to greater compaction of circuit elements. In some cases, there may not be sufficient space for circuit elements in a fluidic die with a sparse arrangement of fluidic elements.

In accordance with some implementations of the present disclosure, as shown in FIG. 1, a fluidic die 102 includes fluidic elements in the form of fluidic cells 104. A "fluidic cell" refers to a collection of flow structures, and the fluidic cell can be repeated across the fluidic die 102, such as to form an array. The fluidic cells 104 are interspersed with circuit elements along multiple different axes across a substrate 110 (of the fluidic die 102) on which the fluidic cells 104 and the circuit elements are commonly formed. Fluidic cells are interspersed with circuit elements if along a given axis, successive fluidic cells are separated by circuit element(s), and successive circuit elements are separated by fluidic cell(s).

The different axes include a first axis 106 and a second axis 108 that is substantially orthogonal to the first axis 106. The first axis 106 and the second axis 108 are substantially orthogonal if the first axis 106 has an angle with respect to the second axis 108 that is in any of the following ranges: between 45° and 135°, between 60° in 120°, between 75° and 115°, and so forth.

Each circuit element in FIG. 1 is represented as a block with a "C" in the block. Each circuit element C includes an active device or multiple active devices. In some examples, active devices of a circuit element C can be interconnected to provide a logical operation, such as a logical AND, a logical OR, a logical inversion, and so forth. Active devices of a circuit element C can also be used to perform other types of operations, such as to provide a latch, a register, or another storage element, to provide a variable resistance, and so forth. As an example, a circuit element C can be part of control circuitry of the fluidic die 102, where the control circuitry is used to control an operation of the fluidic cells 104 (and more specifically, the fluidic actuators in the fluidic cells 104), in response to input signals, such as address signals, control signals, data, and so forth. The input signals may be received from a controller of fluid dispensing system, such as a print controller of a printing system.

In further examples, the active devices of a circuit element C can be used to implement analog circuitry. As noted above, examples of active devices include transistors and diodes, or any other device that can be switched between different states in response to an input signal.

In the example of FIG. 1, the fluidic cells 104 are arranged in a two-dimensional array, along the first axis 106 and the second axis 108. In other examples, the array of fluidic cells 104 can have a different pattern; for example, instead of a row or column that is generally parallel to the axis 106 or 108, respectively, a line of fluidic cells 104 may be slanted with respect to the axis 106 or 108. Moreover, instead of the fluidic cells 104 having a regular pattern, the fluidic cells 104 may have an irregular pattern or even a random pattern across the substrate 110 of the fluidic die 102.

In some examples, a first quantity of circuit elements interspersed in regions between the fluidic cells 104 along the axis 106 is greater than a specified number (e.g., 10, 20, etc.), and a second quantity of circuit elements interspersed in regions between the fluidic cells 104 along the axis 108 is greater than a specified number (e.g., 10, 20, etc.).

Each fluidic cell 104 includes a respective fluid feed hole 112 and a fluid chamber 114 into which a fluid can be fed through the fluid feed hole 112, in the example of FIG. 1. The fluidic cell 104 can also include a fluidic actuator 115, which when activated causes the fluid in the fluid chamber to be dispensed through an orifice (not shown in FIG. 1) of the fluidic cell 104. In further examples, a fluidic cell 104 can include multiple fluid feed holes and/or multiple orifices.

Although specific flow structures have been identified as being part of the fluidic cell 104, it is noted that in other examples, additional or alternative types of flow structures can be included in each fluidic cell 104.

In the example of FIG. 1, an array of fluid feed holes 112 is arranged in multiple dimensions (e.g., along the axes 106 and 108). The array of fluid feed holes 112 include distinct fluid feed holes that extend along a first dimension of the multiple dimensions, and distinct fluid feed holes that extend along a different second dimension of the multiple dimensions. "Distinct" fluid feed holes refer to fluid feed holes that are individually separate from one another, as opposed to a fluid feed slot that can extend a relatively long length to feed multiple fluidic cells, such as a column of fluidic cells. The fluid feed holes 112 are used to communicate fluid with respective fluid chambers of the fluidic cells 104.

The fluidic die 102 has multiple outer edges 102-1, 102-2, 102-3, and 102-4, which collectively form a general rectangle (when viewed from the top or bottom) in the example of FIG. 1. An "outer edge" of a fluidic die refers to a segment of an outermost boundary of the fluidic die 102. In other examples, the fluidic die 102 can have different shapes.

In some examples, either the first dimension or the second dimension of the multiple dimensions along which the array of fluid feed holes 112 is arranged can be parallel to an outer edge (one of 102-1, 102-2, 102-3, and 102-4) of the fluidic die 102. In further examples, both the first dimension and the second dimension are parallel to respective outer edges of the fluidic die 102.

In addition, each of multiple fluid feed holes along the first dimension (e.g., along the axis 106) is distinct from multiple fluid feed holes along the second dimension (e.g., along the axis 108). For example, in the first row 150 of the array of fluidic cells 104 shown in FIG. 1, each of fluid feed holes 112 in the fluidic cells 104 in the second column 158 and the third column 160 is distinct from multiple fluid feed holes 112 in the fluidic cells 104 in the second row 152 and last row 154 of the first column 156 of the array. Even though there is a common fluidic cell 104 at the intersection of the first row 150 and the first column 156, the first row 150 has multiple fluidic cells (in columns other than the first column 156) that are distinct from multiple fluidic cells in the first column 156 (in rows other than the first row 150).

In some examples, the fluidic die 102 can be mounted on a support structure (e.g., a print cartridge, a carriage, etc.), which is relatively moveable with respect to a target to which fluid of the fluidic die 102 is to be dispensed. For example, the target can be a print substrate onto which printing fluid is to be dispensed in a 2D printing system, or a 3D build part onto which liquid agents are to be dispensed during a 3D build operation of a 3D printing system. The fluidic die 102 is relatively moveable with respect to the target if either or both of the fluidic die 102 and the target is (are) moveable. In some examples, the fluidic die 102 is relatively moveable with respect to the target along a direction that is parallel to either axis 106 or 108.

Regions that are without flow structures are provided between successive fluidic cells 104 along both the first axis 106 and the second axis 108. Such regions are not used by the fluidic cells 104 for fluid flow. The circuit elements are placed in the regions between the fluidic cells 104. As a result, the circuit elements are interspersed with the fluidic cells 104 along both the axes 106 and 108. The elements of the fluidic cells 104 being interspersed with the circuit elements result in an alternating arrangement of fluidic elements and circuit elements along the different axes 106 and 108.

By alternating the fluidic elements with the circuit elements in multiple different axes, more space on the substrate 110 of the fluidic die 102 is provided to accommodate the circuit elements while still allowing for a sparse arrangement of the fluidic cells 104, in some examples.

The fluidic cells 104 and the circuit elements are formed on a common substrate, i.e., the substrate 110 of the fluidic die 102. The substrate 110 can be a silicon substrate, or a substrate formed of another semiconductor material or a different material. Forming the fluidic cells 104 and the circuit elements on a common substrate refers to forming layers of the fluidic cells 104 and the circuit elements as part of an integrated circuit processing flow for a single integrated circuit device, which in FIG. 1 is the fluidic die 102. Circuit elements and fluidic cells 104 formed on different substrates, such as being part of different integrated circuit devices formed using different integrated circuit process flows, would not be considered to be formed on a common substrate.

Figure 2:
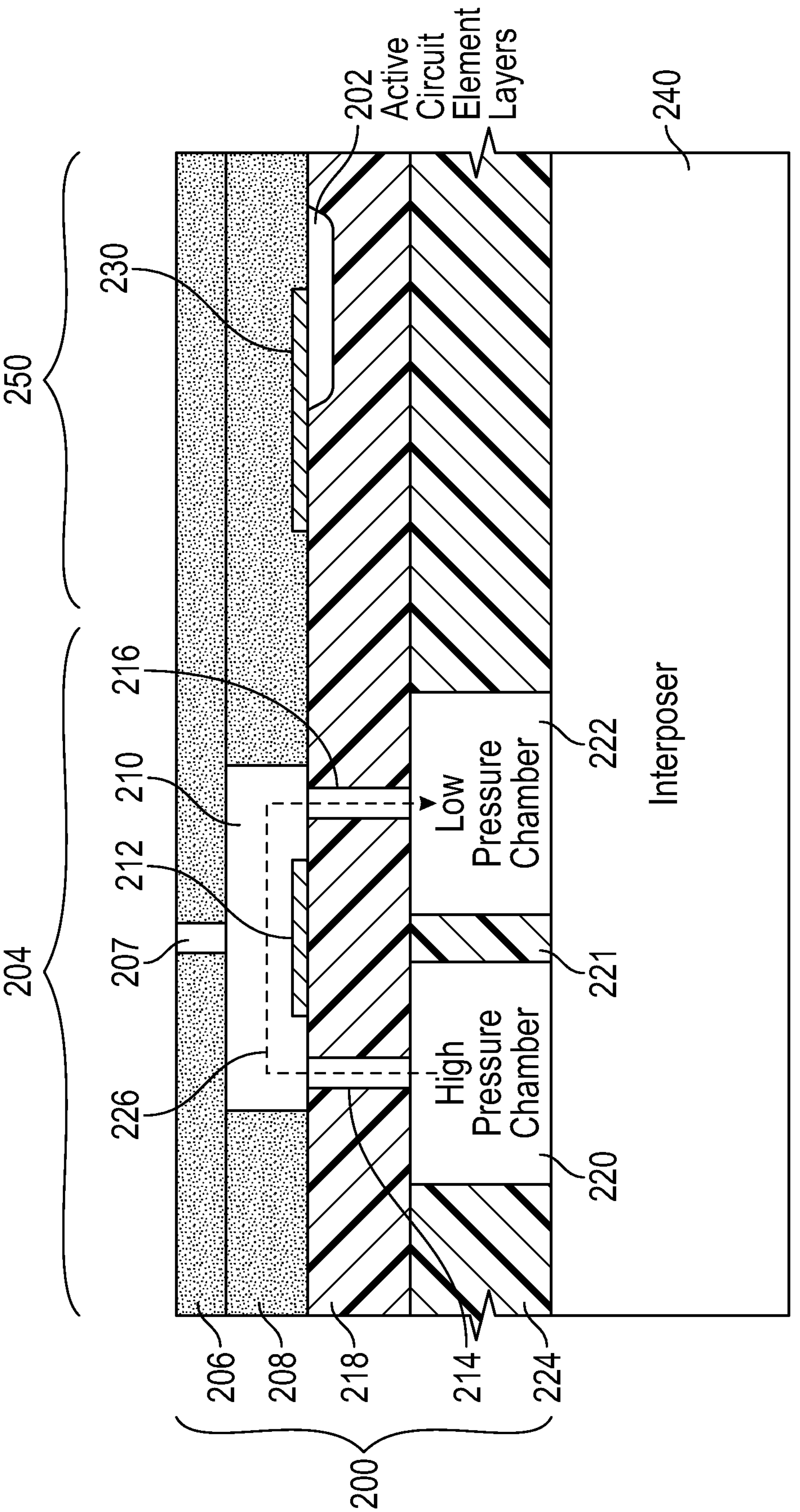
FIG. 2 is a schematic sectional view of a portion of a fluidic die including circuit element layers and layers of a fluidic cell, according to some examples.

FIG. 2 is a schematic sectional view of a portion of a fluidic die 200 attached to an interposer 240 or another type of structure, according to further examples. The fluidic die 200 includes layers 206, 208, 218, and 224. A "layer" (any of 206, 208, 218, and 224) can include a single layer or multiple layers, possibly formed of different materials. The layers 224 and 218 make up a substrate for the fluidic die 200. The layers 224 and 218 can include epoxy-based photoresist (e.g., SU-8), silicon, another semiconductor material, or a different material.

FIG. 2 shows layers of a fluidic cell 204 and a circuit element (202 represents active circuit element layers, such as layers of an active device or multiple active devices). The circuit element layers 202 can include any or some combination of metal layers, polysilicon layers, doped regions, and so forth. Doped regions can be formed into the layer 218. Metal layers and polysilicon layers of active devices can be formed over the doped regions. A thin film interconnect layer or layers 230 (including a metal or another electrically conductive material) can be formed over the layer 218, where the thin film interconnect layer 230 can form an electrical contact or via to electrically connect to an active device.

The fluidic cell 204 can be arranged in similar manner as the fluidic cell 104 of FIG. 1 (i.e., multiple fluidic cells 204 can be arranged in an array along multiple axes, such as the axes 106 and 108 shown in FIG. 1). The circuit elements formed using circuit element layers 202 can also be interspersed with the fluidic cells 204 along multiple different axes.

The fluidic cell 204 includes an orifice layer 206 in which an orifice 207 (or multiple orifices) is (are) formed. A chamber layer 208 is provided under the orifice layer 206, and the chamber layer 208 defines a fluid chamber 210. The layers 206 and 208 can include any of various different types of materials, such as epoxy, silicon, and so forth.

A fluidic actuator 212 is formed over the layer 218 in the fluid chamber 210. If the fluidic actuator is a resistive heater, the fluidic actuator 212 can be formed using a thin film of an electrically resistive material (such as tungsten-silicon nitride, polysilicon or any other material that exhibits electrical resistivity). Activation of the fluidic actuator 212 causes fluid in the fluid chamber 210 to be expelled through the orifice 207.

In some examples, the circuit element layers 202 are formed on the substrate (including layers 224 and 218) of the fluidic die 200 before various layers of the fluidic cell 204. A layer is on the substrate if the layer is directly on the substrate, or if the layer is supported by the substrate through other layer(s). The chamber layer 208 is formed over the layer 218 as well as over thin film layers (the thin film layer for the fluidic actuator 212 and the thin film interconnect layer 230). Thus, in FIG. 2, the active circuit element layers 202 are formed over the substrate (including layers 224 and 218) prior to the layers 208 and 206 for the fluidic cell 204. After the active circuit element layers 202 are formed over the substrate, the thin film layers (the thin film layer for the fluidic actuator 212 and the thin film interconnect layer 230) are formed, followed by the fluidic cell layers 208 and 206 over the active circuit element layers 202.

In the example of FIG. 2, two fluid feed holes 214 and 216 are formed in a feed hole layer 218 (by etching the feed hole layer 218 to form the fluid feed holes, for example). The fluid feed hole 214 is an inlet fluid feed hole that allows fluid to flow into the fluid chamber 210. The fluid feed hole 216 is an outlet fluid feed hole from which fluid in the fluid chamber 210 flows. The inlet fluid feed hole 214 is in communication with a high pressure chamber 220, and the outlet fluid feed hole 216 is in communication with a low pressure chamber 222. The high pressure chamber 220 and the low pressure chamber 222 are formed in a layer 224 (by etching the layer 224 to form the chambers 220 and 222, for example). The high pressure chamber 220 is divided from the low pressure chamber 222 by a wall 221 of the layer 224.

The pressure in the high pressure chamber 220 and the pressure in the low pressure chamber 222 can be controlled by respective pressure regulators (not shown). The high pressure chamber 220 has a pressure that is higher than the pressure of the low pressure chamber 222.

The arrangement of the fluidic cell 204 allows for fluid recirculation along fluid path 226. Fluid can flow from the high pressure chamber 220 into the inlet fluid feed hole 214, which is then passed to the fluid chamber 210. The fluid exits from the fluid chamber 210 through the outlet fluid feed hole 216 to the low pressure chamber 222.

Recirculation can be performed to carry any contaminants that may be in the fluid chamber 210 out of the fluid chamber 210. In other examples, recirculation of fluid through the fluid chamber 210 can be performed for other purposes.

Although a specific arrangement is shown in FIG. 2 to enable fluid recirculation in the fluidic cell 204, recirculation can be enabled using other arrangements in other examples.

The circuit element layers 202 are formed in a region 250 that is devoid of flow structures of the fluid cell 204. The region 250 is between successive fluidic cells 204 in each of multiple axes, such as axes 106 and 108 shown in FIG. 1.

The interposer 240 is a structure that is attached to the fluidic die 200. The interposer 240 can include fluid flow channels (not shown) to communicate fluid with the chambers 220 and 222. The interposer 240 can be a die that is separate from the fluidic die 200.

Figure 3:
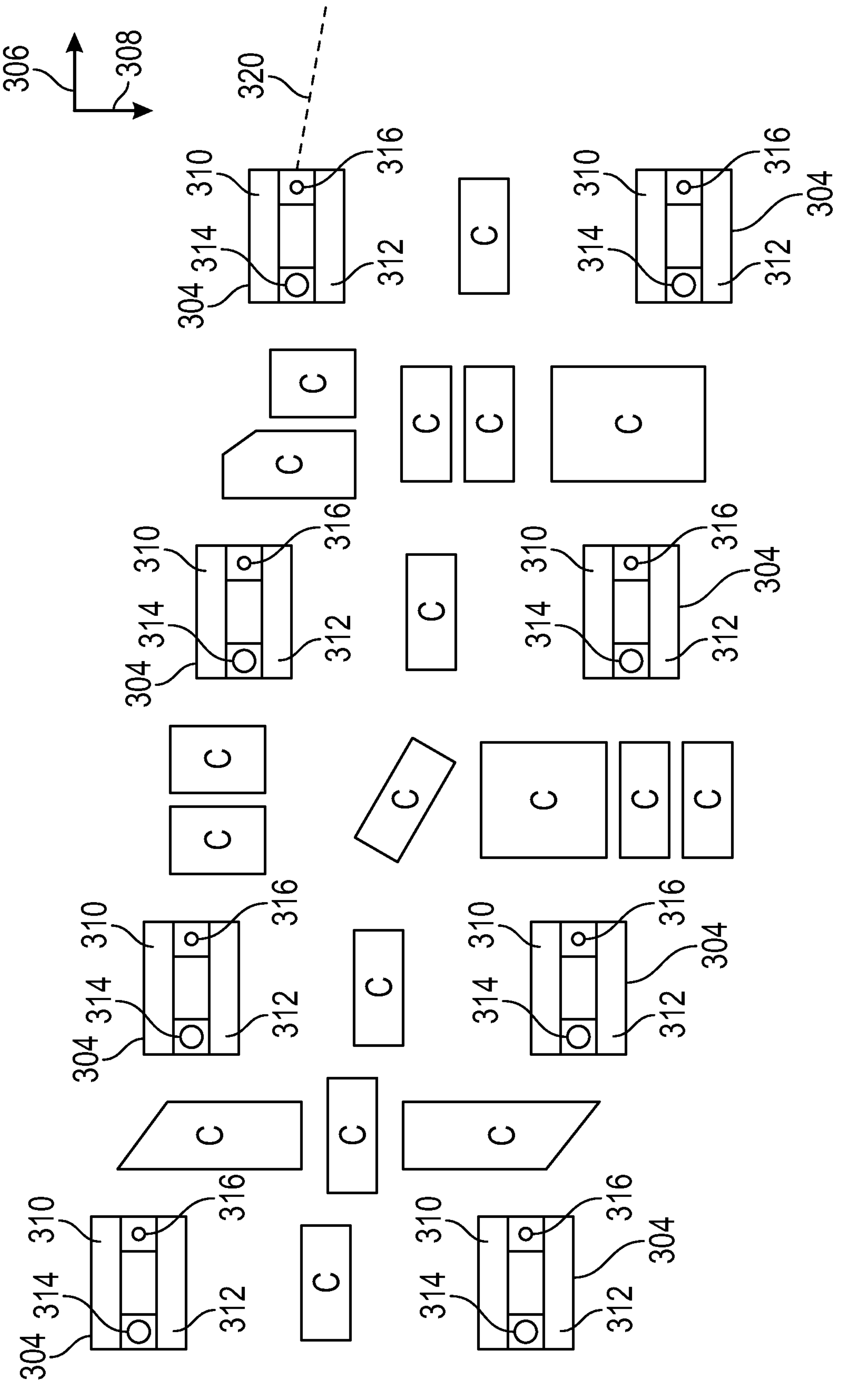
FIG. 3 is a block diagram of a portion of a fluidic die including an interspersed arrangement of fluidic cells and circuit elements, according to some examples.

FIG. 3 is a block diagram of a portion of a fluidic die according to further examples, in which fluidic cells 304 and circuit elements (represented by blocks labeled with a "C") are interspersed along different axes 306 and 308. The fluidic cells 304 in FIG. 3 have a stepped arrangement with respect to the axis 306. Thus, unlike the arrangement of FIG. 1 where the fluidic cells 104 are aligned in rows and columns that are generally parallel to the respective axes 106 and 108, the arrangement of the fluidic cells 304 in FIG. 3 is a stepped arrangement in which the fluidic cells 304 are stepped downwardly with respect to the axis 306 such that a line of fluidic cells 304 (extending generally along 320) is not parallel to the axis 306. The line (320) of fluidic cells is angled (slanted) with respect to the axis 306. In the stepped arrangement, each successive fluidic cell 304 along the line 320 is shifted downwardly (along the axis 308) from the immediately preceding fluidic cell 304 along the line 320, so that the line 320 of fluidic cells 304 progressively step downwardly along the axis 308 relative to the axis 306.

Along the orthogonal axis 308, the fluidic cells 304 are lined up generally parallel to the axis 308.

Each fluidic cell 304 includes fluid feed holes 310 and 312 (e.g., similar to the fluid feed holes 214 and 216 shown in FIG. 2). Also, each fluidic cell 304 includes orifices 314 and 316. For example, the orifice 314 is larger than the orifice 316.

Figure 4:
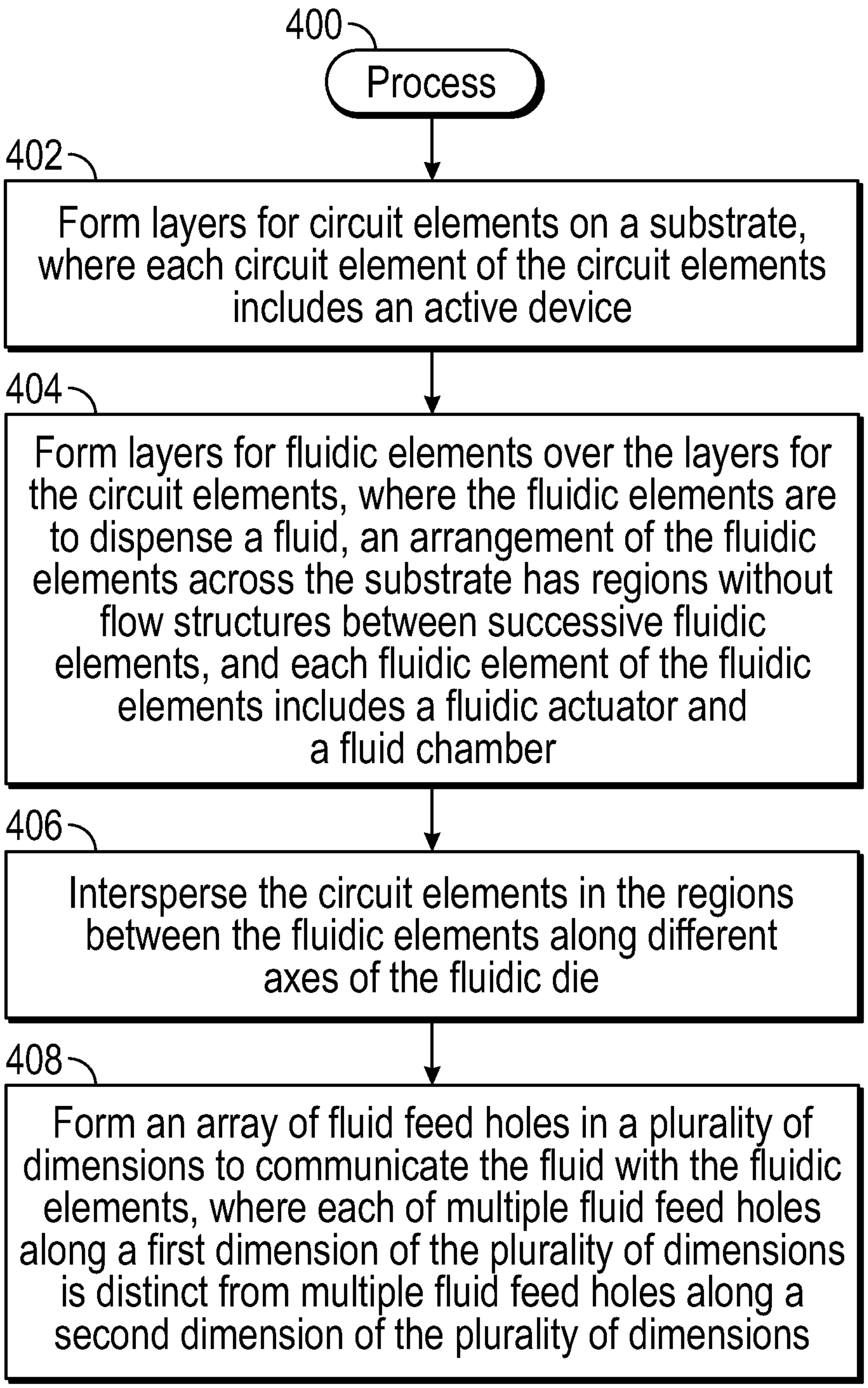
FIG. 4 is a flow diagram of a process of forming a fluidic die, according to some examples.

FIG. 4 is a flow diagram of a process 400 of forming a fluidic die (e.g., a fluidic die according to FIG. 1, 2, or 3), in accordance with some examples.

The process 400 includes forming (at 402) layers for circuit elements on a substrate, where each circuit element of the circuit elements includes an active device (e.g., a transistor or a diode).

The process 400 includes forming (at 404) layers for fluidic elements over the layers for the circuit elements, where the fluidic elements are to dispense a fluid, an arrangement of the fluidic elements across the substrate has regions without flow structures between successive fluidic elements, and each fluidic element of the fluidic elements includes a fluidic actuator and a fluid chamber.

The process 400 includes interspersing (at 406) the circuit elements in the regions between the fluidic elements along different axes of the fluidic die.

The process 400 includes forming (at 408) an array of fluid feed holes in a plurality of dimensions to communicate the fluid with the fluidic elements, where each of multiple fluid feed holes along a first dimension of the plurality of dimensions is distinct from multiple fluid feed holes along a second dimension of the plurality of dimensions.

Figure 5:
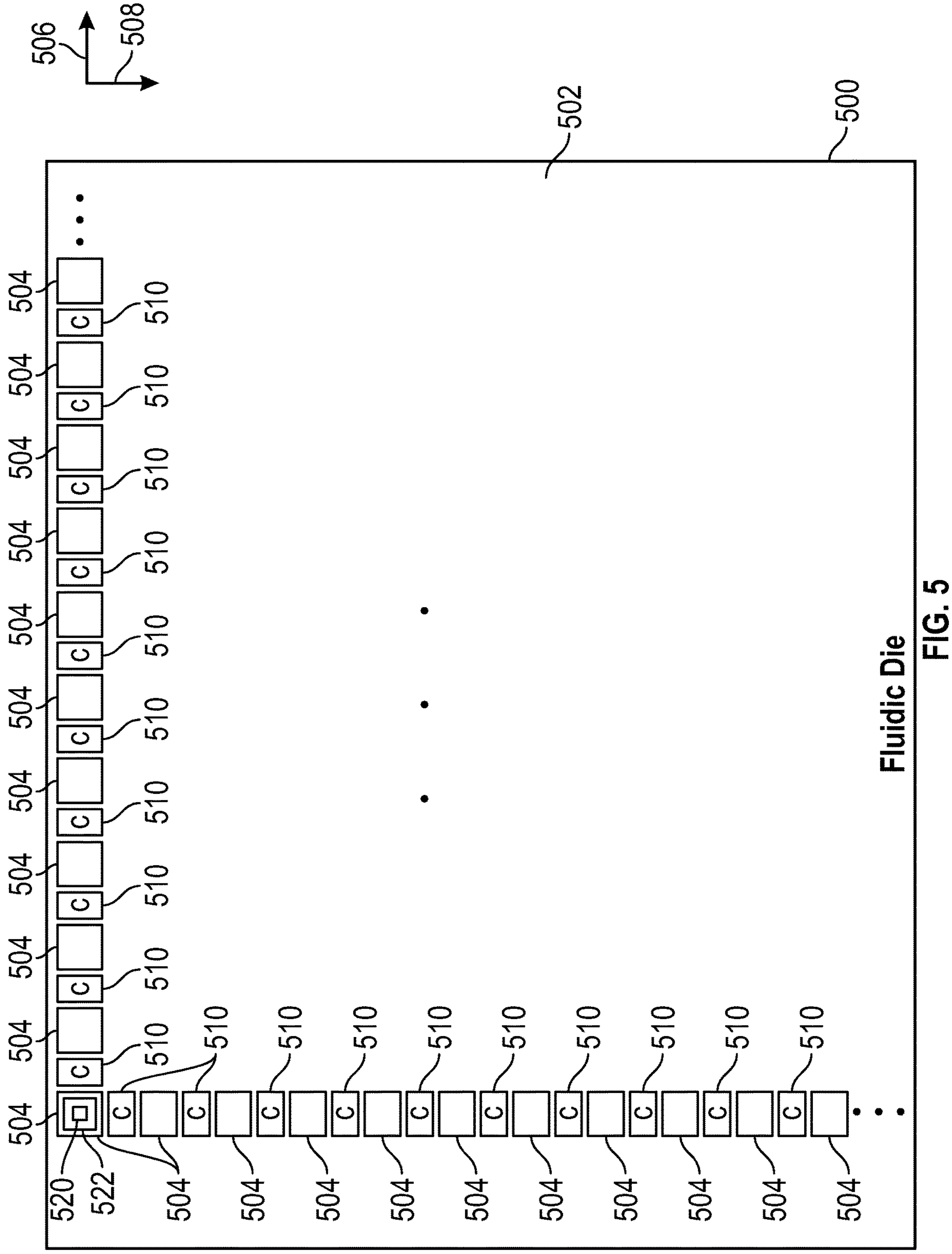
FIG. 5 is a block diagram of a fluidic die according to further examples.

FIG. 5 is a block diagram of a fluidic die 500 according to further examples. The fluidic die 500 includes a substrate 502 and an arrangement of fluidic elements 504 on the substrate 502 to dispense a fluid, each fluidic element of the fluidic elements 504 including a fluidic actuator 520 and a fluid chamber 522. The arrangement of fluidic elements 504 includes first fluidic elements along a first axis 506 across the substrate 502, and second fluidic elements along a different second axis 508 across the substrate.

The fluidic die 500 further includes circuit elements 510 on the substrate 502. The circuit elements 510 are interspersed between the fluidic elements 504 along each of the first axis 506 and the second axis 508. Each circuit element 510 of the circuit elements 510 includes an active device. The circuit elements 510 include greater than 10 first circuit elements along the first axis 506 in first regions between successive first fluidic elements 504, and greater than 10 second circuit elements along the second axis 508 in second regions between successive second fluidic elements 504.

The fluidic elements 504 and the circuit elements 510 include integrated circuit layers commonly formed on the substrate 502.

Interspersed arrangements of fluidic elements and circuit elements according to some examples of the present disclosure may provide various benefits. For example, greater space is provided on the substrate of a fluidic die to accommodate circuit elements in a sparse arrangement of fluidic elements. Also, circuit elements being placed closer to fluidic elements can reduce parasitic impedances in signals transmitted by the circuit elements. Interspersing circuit elements with fluidic elements allows for a greater density of the circuit elements without increasing the overall size of a fluidic die.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A fluidic die comprising:

an arrangement of fluidic elements to dispense a fluid, each fluidic element of the fluidic elements comprising a fluidic actuator and a fluid chamber;

an array of fluid feed holes in a plurality of dimensions to communicate the fluid with the fluidic elements, wherein each of multiple fluid feed holes along a first dimension of the plurality of dimensions is distinct from multiple fluid feed holes along a second dimension of the plurality of dimensions; and circuit elements interspersed in regions between the fluidic elements along different axes of the fluidic die, wherein each circuit element of the circuit elements comprises an active device, wherein the fluidic elements and the circuit elements are formed on a common substrate.

2. The fluidic die of claim 1, wherein the active device comprises a transistor.

3. The fluidic die of claim 1, wherein the active device comprises a diode.

4. The fluidic die of claim 1, wherein a first quantity of circuit elements interspersed in regions between the fluidic elements along a first axis of the different axes is greater than 10, and a second quantity of circuit elements interspersed in regions between the fluidic elements along a second axis of the different axes is greater than 10.

5. The fluidic die of claim 1, wherein the first dimension of the plurality of dimensions is parallel to an outer edge of the fluidic die.

6. The fluidic die of claim 1, wherein each fluidic element of the fluidic elements further comprises an inlet fluid feed hole and an outlet second fluid feed hole to recirculate a fluid through the fluid chamber of the fluidic element.

7. The fluidic die of claim 1, wherein each fluidic element of the fluidic elements further comprises an orifice through which a fluid from the fluid chamber of the fluidic element is dispensed.

8. The fluidic die of claim 1, wherein the arrangement of the fluidic elements comprises:

first fluidic elements extending along a first axis of the different axes, wherein first regions without flow structures are provided between successive fluidic elements of the first fluidic elements, and second fluidic elements extending along a second axis of the different axes, wherein second regions without flow structures are provided between successive fluidic elements of the second fluidic elements, and wherein the circuit elements comprise:

first circuit elements in the first regions, and second circuit elements in the second regions.

9. The fluidic die of claim 1, wherein the different axes are substantially orthogonal axes.

10. The fluidic die of claim 1, wherein layers of the fluidic elements are formed over layers of the circuit elements on the common substrate.

11. A method of forming a fluidic die, comprising:

forming layers for circuit elements on a substrate, wherein each circuit element of the circuit elements comprises an active device;

forming layers for fluidic elements over the layers for the circuit elements, wherein the fluidic elements are to dispense a fluid, an arrangement of the fluidic elements across the substrate has regions without flow structures between successive fluidic elements, and each fluidic element of the fluidic elements comprises a fluidic actuator and a fluid chamber;

interspersing the circuit elements in the regions between the fluidic elements along different axes of the fluidic die; and forming an array of fluid feed holes in a plurality of dimensions to communicate the fluid with the fluidic elements, wherein each of multiple fluid feed holes along a first dimension of the plurality of dimensions is distinct from multiple fluid feed holes along a second dimension of the plurality of dimensions.

12. The method of claim 11, wherein forming the layers for the circuit elements comprises forming the layers for transistors or diodes.

13. The method of claim 11, wherein the different axes comprise a first axis and a second axis substantially orthogonal to the first axis, and wherein interspersing the circuit elements in the regions comprises alternating the circuit elements and the fluidic elements along each axis of the first axis and the second axis.

14. A fluidic die comprising:

a substrate;

an arrangement of fluidic elements on the substrate to dispense a fluid, each fluidic element of the fluidic elements comprising a fluidic actuator and a fluid chamber, wherein the arrangement of fluidic elements comprises first fluidic elements along a first axis across the substrate, and second fluidic elements along a different second axis across the substrate; and circuit elements on the substrate and interspersed between the fluidic elements along each of the first axis and the second axis, wherein each circuit element of the circuit elements comprises an active device, and wherein the circuit elements comprise greater than 10 first circuit elements along the first axis in first regions between successive first fluidic elements, and greater than 10 second circuit elements along the second axis in second regions between successive second fluidic elements, wherein the fluidic elements and the circuit elements comprise integrated circuit layers commonly formed on the substrate.

15. The fluidic die of claim 14, further comprising:

an array of fluid feed holes in a plurality of dimensions to communicate the fluid with the fluidic elements, wherein a first dimension of the plurality of dimensions is parallel to an outer edge of the fluidic die.

* * * * *